US009699160B2

(12) United States Patent
Williams et al.

(10) Patent No.: US 9,699,160 B2
(45) Date of Patent: Jul. 4, 2017

(54) SYSTEM AND METHODS FOR EXCHANGING IDENTITY INFORMATION AMONG INDEPENDENT ENTERPRISES WHICH MAY INCLUDE PERSON ENABLED CORRELATION

(71) Applicant: Araxid Prime, Inc., McLean, VA (US)

(72) Inventors: J. Brent Williams, Arlington, VA (US); Dennis Tackett, Youngsville, NC (US); Dennis Rizzi, Great Falls, VA (US)

(73) Assignee: Verato, Inc., McLean, VA (US)

( * ) Notice: Subject to any disclaimer, the term of this patent is extended or adjusted under 35 U.S.C. 154(b) by 26 days.

(21) Appl. No.: 14/594,068

(22) Filed: Jan. 9, 2015

(65) Prior Publication Data

US 2015/0200927 A1   Jul. 16, 2015

Related U.S. Application Data

(63) Continuation-in-part of application No. 14/522,670, filed on Oct. 24, 2014.

(60) Provisional application No. 61/926,140, filed on Jan. 10, 2014.

(51) Int. Cl.
  *H04L 29/06* (2006.01)
(52) U.S. Cl.
  CPC .......... *H04L 63/08* (2013.01); *H04L 63/0869* (2013.01)
(58) Field of Classification Search
  CPC ..................................................... H04L 63/08
  See application file for complete search history.

(56) References Cited

U.S. PATENT DOCUMENTS

| | | |
|---|---|---|
| 7,587,588 B2 | 9/2009 | Clemmons, II et al. |
| 7,680,819 B1 | 3/2010 | Mellmer et al. |
| 7,856,655 B2 | 12/2010 | Swander et al. |
| 8,023,929 B2 | 9/2011 | Mgrdechian et al. |
| 8,122,153 B2 | 2/2012 | Sun |
| 8,190,888 B2 | 5/2012 | Batke et al. |
| 8,201,233 B2 | 6/2012 | Beaulieu et al. |
| 8,302,183 B2 | 10/2012 | Sood |
| 8,321,918 B2 | 11/2012 | Cho et al. |
| 8,332,923 B2 | 12/2012 | Oba et al. |
| 8,572,111 B2 | 10/2013 | McDonald |

(Continued)

FOREIGN PATENT DOCUMENTS

WO   02028125 A2   4/2002

OTHER PUBLICATIONS

Coxe, David "Criterion White Paper: Federated Online Attribute Exchange Initiatives," (Jun. 14, 2012) 7 pages.

(Continued)

*Primary Examiner* — Techane Gergiso
*Assistant Examiner* — Tri Tran
(74) *Attorney, Agent, or Firm* — Fox Rothschild LLP; Jeff Schwartz

(57) ABSTRACT

A system and method for exchanging identity information and for correlating protected data across independent data systems connected through a network is disclosed. The system contains connectors in communication with protected data systems which house the protected data. Data is correlated between the protected data systems through coincident authentication of both systems by a user. Messages are exchanged which allow the identity exchange system to correlate data based on a session identifier from an authenticated session on one of the protected data systems.

15 Claims, 7 Drawing Sheets

(56) References Cited

U.S. PATENT DOCUMENTS

| | | | |
|---|---|---|---|
| 8,621,570 B2 | 12/2013 | Naslund et al. | |
| 8,631,038 B2 | 1/2014 | Mellmer et al. | |
| 2005/0114447 A1 | 5/2005 | Cameron et al. | |
| 2005/0193211 A1 | 9/2005 | Kurose | |
| 2005/0289343 A1 | 12/2005 | Tahan | |
| 2006/0021019 A1* | 1/2006 | Hinton | G06F 21/41 726/10 |
| 2006/0046692 A1 | 3/2006 | Jelinek et al. | |
| 2007/0089163 A1 | 4/2007 | Denton | |
| 2007/0199049 A1 | 8/2007 | Ziebell | |
| 2008/0307234 A1 | 12/2008 | Salowey et al. | |
| 2009/0307755 A1* | 12/2009 | Dvorak | G06F 19/322 726/4 |
| 2010/0188992 A1 | 7/2010 | Raleigh | |
| 2011/0030043 A1 | 2/2011 | Jones et al. | |
| 2011/0066446 A1* | 3/2011 | Malec | G06F 19/328 705/2 |
| 2011/0119744 A1 | 5/2011 | Cho et al. | |
| 2012/0204032 A1 | 8/2012 | Wilkins et al. | |
| 2013/0247159 A1 | 9/2013 | Hall et al. | |
| 2013/0254882 A1 | 9/2013 | Kannappan et al. | |

OTHER PUBLICATIONS

Detmer et al., "Integrated Personal Health Records: Transformative Tools for Consumer-Centric Care," BMC Medical Informatics and Decision making (2008), 8:45, 13 pages.

Glasgow et al., "An AT&T White Paper on Assurance," 19 pages.

Health Record Banking Alliance White Paper—A Proposed National Infrastructure for HIE Using personally Controlled Records (Jan. 4, 2013) 9 pages.

Oasis—30 Day Public Review for Electronic Identity Credential Trust Elevation Framework V1.0 (Dec. 12, 2013) 2 pages.

OIX—An Open Market Solution for Online Identity Assurance (Mar. 2010) pp. 1-13.

OIX—Trust Framework Requirements and Guidelines V1 (Draft 01) (2013) 7 pages.

Reed et al, "The Personal Network: A New Trust Model and Business Model for Personal Data," The Personal Network (May 2011): 22 pages.

Sun Microsystems: horizons Healthcare Integration through a New Perspective 2010 "Identity Management: Securing Information in the HIPAA Environment," 33 pages.

Nationwide Health Information Network Exchange and the SSA Patient Authorization (Jun. 18, 2012) 12 pages.

McMurry et al., "A Self-scaling, Distributed Information Architecture for Public Health, Research, and Clincial Care," Journal of American Medical INformatics Association (Aug. 2007); 14(4):527-533.

Jin et al., "Patient-centric Authorization Framework for Sharing Electronic Health Records," Proceedings of the 14th ACM symposium on Access control models and technoligies; ACM Digital Libarary (online) (Jun. 5, 2009)—retrieved on Nov. 18, 2015 from <URL:http://sefcom.asu.edu/publications/patient-centric-authorization-sacmat2009.pdf> pp. 125-134.

\* cited by examiner

SYSTEM AND METHODS FOR EXCHANGING IDENTITY INFORMATION AMONG INDEPENDENT ENTERPRISES WHICH MAY INCLUDE PERSON ENABLED CORRELATION

This application is a non-provisional application claiming priority to U.S. Provisional Patent Application Ser. No. 61/926,140, filed Jan. 10, 2014 which is hereby incorporated by reference as if fully disclosed herein. This application is also a continuation-in-part of U.S. patent application Ser. No. 14/522,670, filed Oct. 24, 2014 which is hereby incorporated by reference as if fully disclosed herein.

FIELD OF THE DISCLOSURE

The inventions disclosed herein relate to the field of information sharing among computer systems, specifically web services interactions that are conducted between two or more heterogeneous enterprises for the sharing of sensitive information.

BACKGROUND

The inventions disclosed herein relate to, by way of example only, an implementation for the Nationwide Health Information Exchange (NwHIN) or any other information sharing network. The NwHIN is a 'network of networks' for exchanging health data. The fabric of the NwHIN is based on web services that provide the framework among NwHIN participants to locate and exchange health information. Examples of NwHIN participants currently include: state level exchanges, IDNs, federal entities, public health entities, and geographically-based health information organizations. In order to qualify as an NwHIN participant, the Health Information Organization (HIO) must receive NwHIN Validation, which includes conformance and compliance testing. When an NwHIN member is asked for medical records, they need to know the identity of the individual for whom the records are being requested. But every organization could have a different identifier for the patients they see. Organization A may keep records by Social Security Number (SSN), while Organization B might keep them by some internally generated patient ID. As can be appreciated by one of ordinary skill in the art, the inventions disclosed herein refer to persons and are broader than just patients

SUMMARY OF THE INVENTION

A system and method for correlating protected data across, for example, independent data systems connected through a network is disclosed. The method includes, for example, generating, by a first connector module in communication with a first data system, a first permanent token which identifies a subject of a first set of protected data stored in said first data system that is to be correlated with a second set of protected data stored in a second data system. The first and second data systems may be independently operated. The first connector module generates, for example, a first temporary token which identifies a transaction in which the first protected data is to be correlated and which is stored in a data file that is exchanged with said second system over said network. An edge data store in an edge server stores the first temporary token. The edge server propagates the first temporary token and the first permanent token to a root server. The first connector module receives an indication from said first data system that said first set of protected data and said second set of protected data may be correlated, wherein said indication includes a second temporary token. The edge server stores a first correlation data set received from the root server that includes said first permanent identifier and a second permanent identifier generated by the second data system and is associated with the second temporary token. The first correlation data set is stored in the edge data store.

DETAILED DESCRIPTION OF THE PREFERRED EMBODIMENTS

Figure 1:
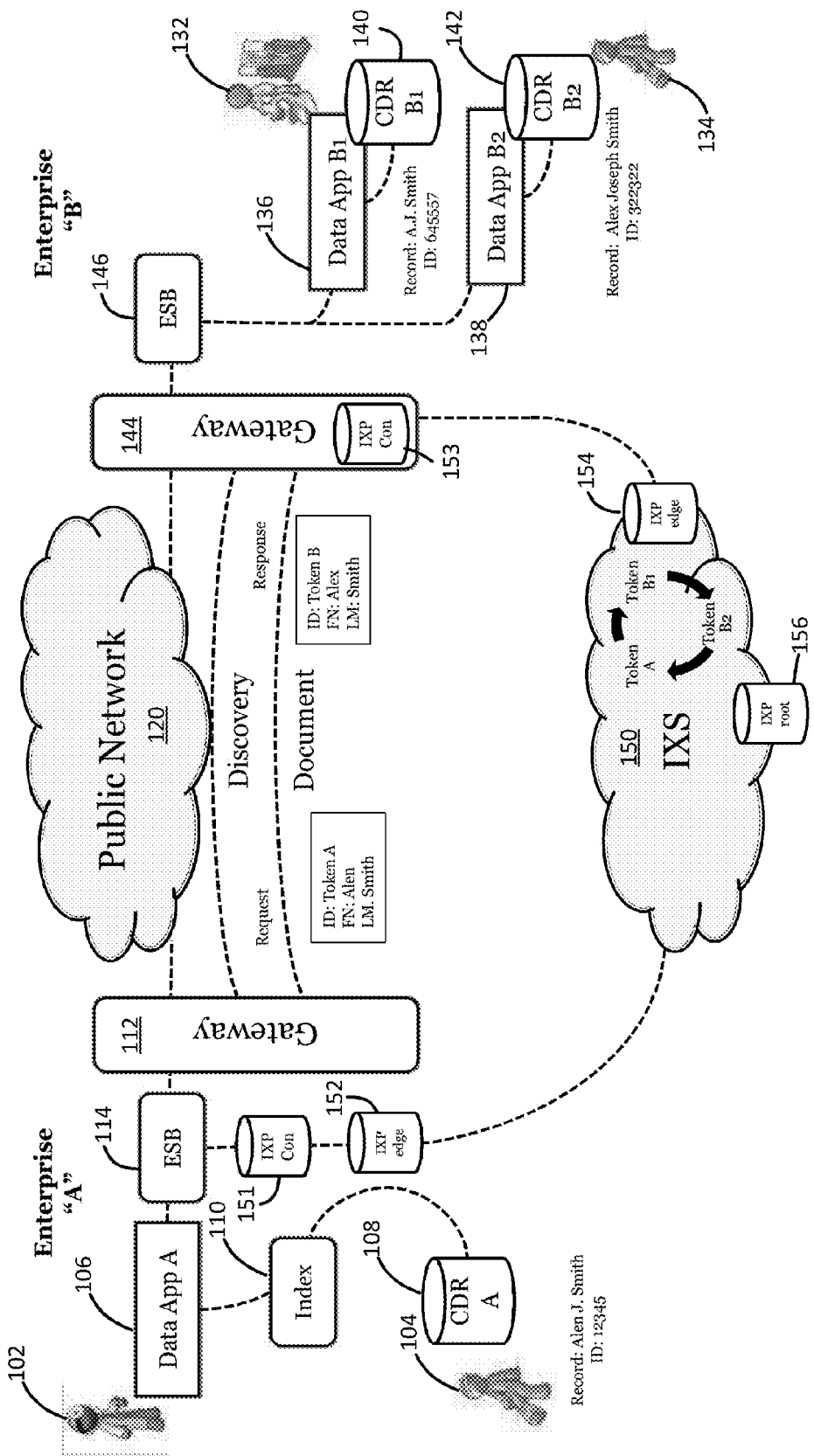
FIG. 1 is a system diagram showing an embodiment of an data exchange system.

Embodiments of the present invention are not limited to the particular methodology, uses, and applications described herein, as these may vary. It is also to be understood that the terminology used herein is used for the purpose of describing particular embodiments only, and is not intended to limit the scope of all embodiments of the present invention. It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art. Similarly, for another example, a reference to "a step" or "a means" is a reference to one or more steps or means and may include sub-steps or subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Unless defined otherwise, all technical and scientific terms used herein have the same meanings as commonly understood by one of ordinary skill in the art to which this invention belongs. Preferred methods, techniques, devices and materials are described although any methods, techniques, devices, or materials similar or equivalent to those described may be used in the practice or testing of the present invention.

All patents and other publications discussed are incorporated herein by reference for the purpose of describing and disclosing, for example, the methodologies described in such publications that might be useful in connection with the present invention. These publications are provided solely for their disclosure prior to the filing date of the present application. Nothing in this regard should be construed as an admission that the inventors are not entitled to antedate or otherwise remove any such publication or patent as prior art for any reason.

As used in this document, the term "share" means provide access for retrieving, downloading, viewing, editing, transferring, or otherwise utilizing or visualizing data in a computer system. To share a data record, or protected data in the data record, means to provide such access as described above to another entity.

As used in this document, the term "token" means any alphanumerical value that can be used to identify a particular transaction and/or entity. Tokens may be randomly generated, sequential, or arbitrary as long as they are sufficiently unique to identify a particular transaction within a particular length of time. Tokens may be permenant or temporary. Permenant tokens are tokens which may be stored indefinitely and may identify a transaction, organization, individual, group, or any other appropriate entity. Temporary tokens may be stored for a defined length of time and may identify a transaction, organization, individual, group, or any other appropriate entity.

As used in this document, identity exchange protocol (IXP) means a protocol that facilitates sharing of identities between enterprises when there is a desire to remove the need to share protected local identity information across the network, and there is a need to provide security and privacy of the linkages between identities.

As used in this document, identity exchange service (IXS) means, for example, the service instantiation, comprised of servers, network, connectors, etc., of the protocol referred to as IXP.

As used in this document, IXP connector means, for example, a Web-Services accessible interface between the enterprise and the IXS. It provides the security of the enterprise ID, while also allowing direct connectivity to the IXS platform. IXP connectors may have subcomponents. For example, an IXP connector may include an enterprise connector, which may be communicatively connected to or otherwise networked with the enterprise data system directly and may reside within the enterprise firewall. Additionally, an IXP connector may include an exchange service connector which may reside outside the enterprise firewall (e.g., in a DMZ) communicatively connected to or otherwise networked with the IXS platform.

As used in this document, IXP edge server means, for example, a server deployed with the segment of the IXP protocol that retrieves IXP calls from the attached connectors and forwards them to the Root for redistribution, synchronization, and security verification. Edge servers may hold the latest version of the correlations provisioned by the root servers. Edge servers may also provide a disaster recovery capability in the connectivity to the IXS wherein numerous IXP connections may be deployed to have failover to several IXP edge servers. Edge servers may maintain the security and integrity of the link between the IXP connector (in the enterprise) and the root servers. Edge servers are, for example, intended to be in close geographic proximity to the IXP connectors to facilitate rapid response and load balancing for requests, but may be located anywhere in a network topology. For purposes of operating a secure, private stand-alone IXS network within an organization, root servers, edge servers and IXP connectors may be deployed within an organization and without a connection to the Internet or other public network.

As used in this document, IXP root server(s) means, for example, the core to the security of the IXS. It may maintain a list of all allowed connectors and the enterprises to which they may be attached. Root servers are, for example, responsible for verifying the security and integrity of the request and pushing updates to the edge servers to facilitate synchronization. Root servers can, for example, provide a disaster recovery capability in the connectivity to the IXS wherein numerous IXP edge servers may be deployed to have failover across all IXP root servers. Root servers are or may be continuously replicated.

Figure 3:
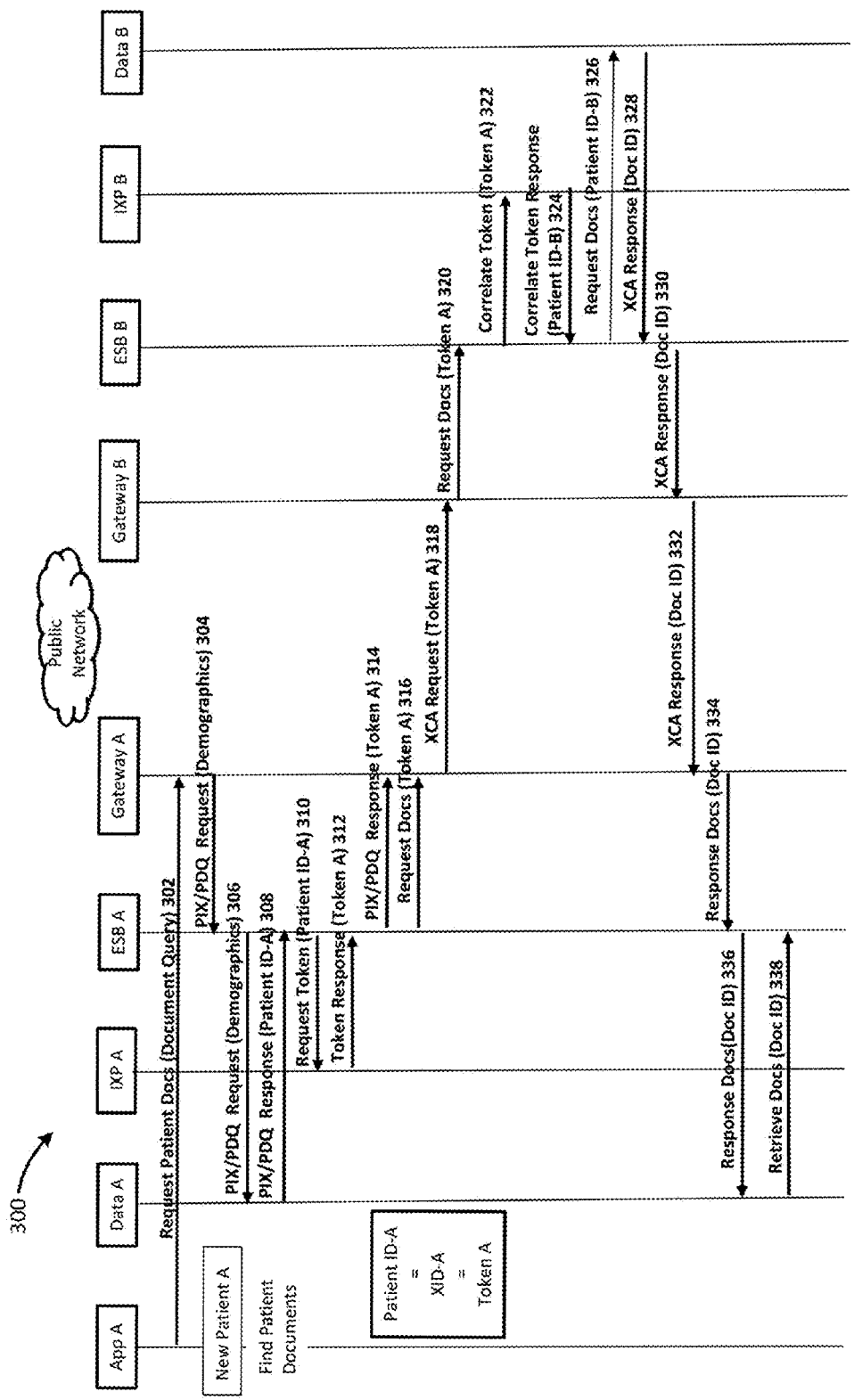
FIG. 3 is a message flow diagram illustrating a method of using IXS.
Figure 4:
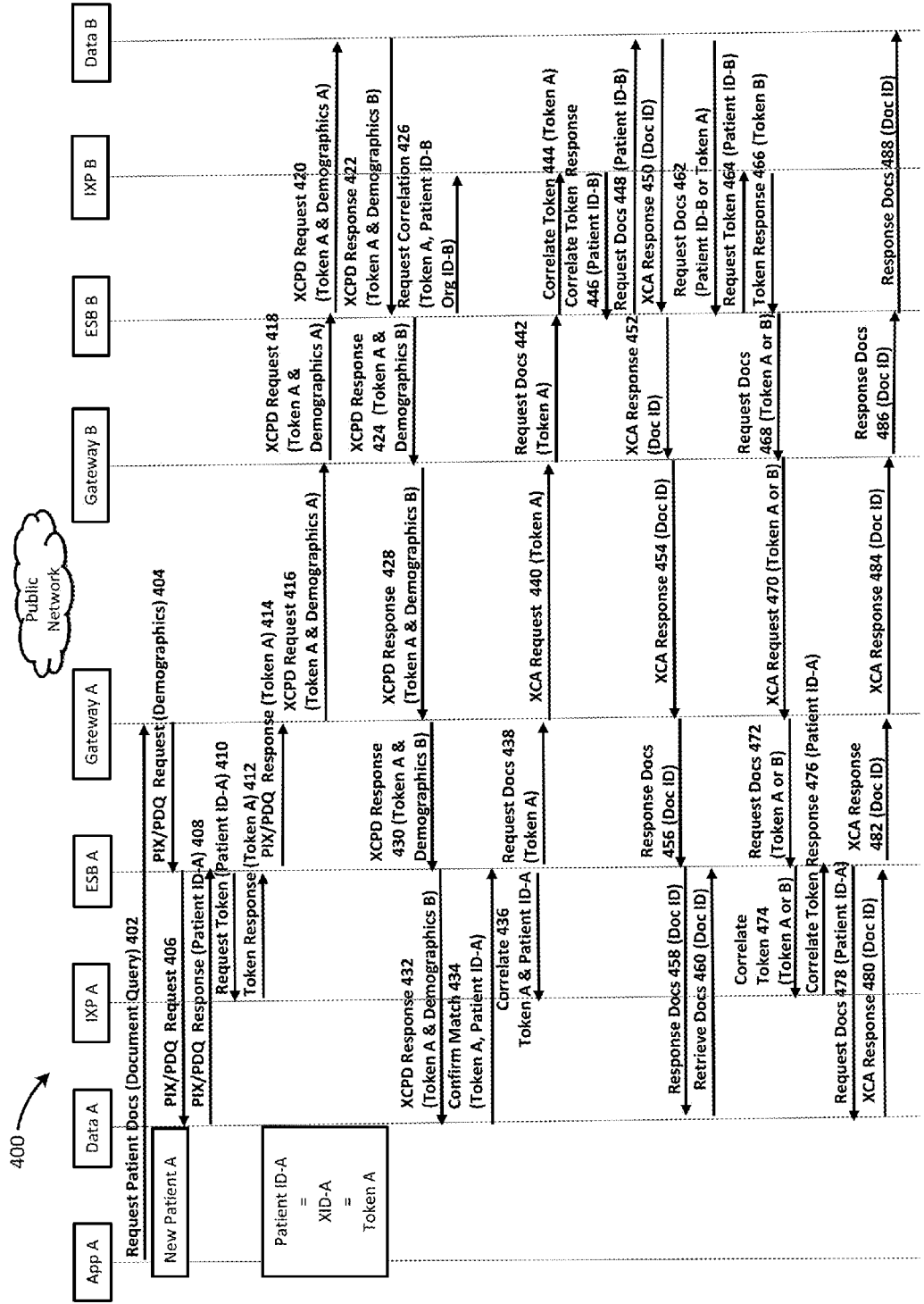
FIG. 4 is a message flow diagram illustrating a method of using IXS.

As used in reference to FIGS. 1, 3, and 4, "App" means, for example, a software application used by an enterprise to access its data system and perform tasks such as, for example, using an enterprise web, software, or other services framework. As used in reference to FIGS. 1, 3, and 4, "enterprise service bus" (ESB) means, for example, any software or hardware component of the enterprise web, software, or other services framework used for designing and implementing communication between mutually interacting software applications in a service-oriented system. For example, an ESB may control communications and interactions between the various components of the data exchange system. Data repository (CDR and/or Data A, B) may be any data system or repository which houses enterprise specific data.

In an example implementation in the healthcare industry, shown in FIG. 1, the patient discovery service interface specification may provide patient arbitration capabilities between organizations to support querying for documents across different organizations, for example Enterprise A and Enterprise B. To search for patient data in the absence of a national identifier, this specification may use, for example, the cross community patient discovery (XCPD). This defines the role of XCPD Initiating Gateway and XCPD Responding Gateway, i.e. gateways 112 and 144.

For example: John Doe on Enterprise A does not equal John Doe on Enterprise B wherein Enterprise A and Enterprise B may both be health information organizations (HIO). Prior to exchanging patient specific data, an HIO may need, for example, assurance that they are looking at the correct record. The Patient Discovery Service may dictate how an HIO may locate and identify patient information that resides on another HIO on the Nationwide Health Information Exchange (NwHIN), over a public network, such as public network 120.

The initiating HIO can enter the demographic data and local identifiers that can be shared about a patient. The responding HIO matches the demographics and identifiers. If a single match is found that is considered highly reliable, it is returned to the initiator, along with its demographic details and identifiers. If no match is found the responder sends an empty response to the initiator, indicating that this patient is not known at this HIO.

If a highly reliable match cannot be identified, an ambiguous response is returned. The service may ask for more information or use a manual process to finish the matching process. Patient Discovery can be designed, for example, to avoid all false positives.

Once initial patient discovery has been completed, there is a likelihood that a new discovery process may be re-initiated. This new discovery process occurs for two reasons. First, additional HIOs may be added to the NwHIN, and as such, the HIO seeking information on a patient should not assume that the prior patient discovery query contains all of the documents available on NwHIN for the patient. Second, the understanding of the patient correlation may change because, by way of example only, additional identifying information may become available to an HIO or the HIO corrected errors in their records that helps resolve their internal identity enumeration strategy.

The Query for Document Service may allow an initiating HIO to request a list of documents about a patient available in the responding HIO. It is dependent on Patient Discovery to provide the patient identifier of the correct patient in the responding HIO. The query permits additional parameters like start/end date and document type to customize which documents are returned.

This interface does not specify whether access consent directives should, preferably be enforced during a document query or during document retrieval.

Note that HIOs can store clinical data in whatever format or repository they choose, provided the HIO can respond to queries as described in this interface. One expected use is that these documents transmitted on the NwHIN may be formatted as XML data following the HL7 clinical document architecture (CDA) standard.

If the query for documents is initiated to an organization (HIO B) for which the identity correlation has already been completed with the originator (HIO A), there may be no need to conduct another patient discovery query.

The retrieve documents service may allow an initiating HIO to request a specific document, by using a unique document identifier. This may be the third step in retrieving data from another HIO, subject discovery and query for documents may be pre-conditions for retrieving documents to be executed.

Some HIOs may generate documents "on demand" by aggregating data from multiple sources. They can ensure that the generated document remains available and unaltered after a document has been retrieved once. As noted in the query for documents section, HIOs can store data internally in the format/repository of choice, as long as they transmit the data in XML/CDA format.

Additionally, while "retrieve document" may retrieve the latest version of the document, the version of the document presented for the request may be also stored and may be retrieved by a document identifier at a later date. As such, the requesting HIO can request the archive data again if required.

If the query for documents is initiated to an organization (HIO B) for which the identity correlation has already been completed with the originator (HIO A), there may be no need to conduct another patient discovery query.

The identity exchange protocol (IXP)/identify exchange service (IXS) system is described for example in the health-care information-sharing context, but any potential information sharing system(s) could leverage IXS. Other system applications include law enforcement, intelligence, legal work, banking, commercial collaborations, and/or any application that requires secure identity exchange, and/or secure exchange of information contained in a given record, and/or secure exchange of information loosely maintained by an enterprise or independent data system.

In an example, a system may be designed such that a IXP Connector within the enterprise may be connected to an IXS system and can be reached by a wide variety of enterprise applications. There are a wide variety of potential sources within the healthcare enterprise that could interface to the IXP connector.

As an example, within the healthcare industry, the source of the calls to and from IXS may originate at the ultimate connector to the primary sharing network. As such, IXS may be better able to meet the objectives. It may be able to prevent the need for distribution of personally identifiable information (PII) if the correlation of the individual's identity associated with their records has already occurred. Additionally, since numerous applications within each enterprise contact the NwHIN connector, this simplifies, expedites, and improves the quality of integration, as there may be only one integration point within each enterprise.

With regard to FIG. 1, two organizations are shown (Enterprise A and Enterprise B) that wish to determine if they both have medical records for a particular individual. Enterprise A and B have declared to IXP that they trust each other, so they can ask each other for records. In this use case, Enterprise A utilizes a public network 120 to send requests to Enterprise B. For example, Enterprise A may request information related to Alen J. Smith, who is assigned patient ID: 12345. When Enterprise A asks the question across the public network, it sends along Alen J. Smith's patient id as it exists in the enterprise database of Enterprise A. This could be very problematic because the Enterprise B may have elected to use Alen's social security number (SSN), and thus the two identifiers do not match, and the records pertaining to Alen J. Smith will not be found on Enterprise B. Enterprise A may therefore leverage IXP to shield this sensitive data by the following means.

An IXP connector 151, 153 may be installed for each organization. The organizations may set up the connector using import files with each organization's patient IDs. Each patient ID imported results in the creation of a new IXP identity or XID, a unique identifier which identifies each individual patient in the organization. The XID may be numerical, alphabetical, a glyph, or any combination, including hexadecimal. In an example, a row may be written to the local data store that pairs an XID to a particular patient ID within the organization. To avoid using the potentially sensitive patient ID, IXP may use this XID to refer to an individual. It is important to note that the XID may have meaning only within the IXS system and only for the organization for which it was created and can never be used to look up information about a patient. The only information paired to the XID may be the organization's local patient ID, and that pairing lives only within the organization's firewall on the IXP Connector.

As shown in FIG. 1, the IXP connector may be installed in a number of configurations depending on the needs of the organization. For example, Enterprise A in FIG. 1 has IXP connector 151 connected directly to enterprise service bus (ESB) 114. ESB 114 controls access between Data App A 106 and gateway 112 and IXP connector 151. In another implementation, as shown in Enterprise B, for example, IXP connector 153 is implemented as part of gateway 144. ESB 146, similar to ESB 114 controls access between Data App B1 136/Data App B2 138 and gateway 144 and IXP connector 153. As implemented by Enterprise B, ESB 146 is connected to IXP connector 153 through a connection to gateway 144. In some implementations, IXP connectors may be software running on the same computer server as gateway 144 or may be a co-located device connected through a wired or wireless data connection to gateway 144.

For IXP to resolve identities, it can, for example, have correlation information input into the root servers 156 and edge servers 152, 154. As shown in FIG. 1, a number of physical implementations are available depending on enterprise needs and capability. For example, Enterprise A has implemented IXP edge server 152 as an onsite server. This and similar implementations may provide fast edge server access to the Enterprise A data network. Although IXP edge server 152 is logically outside of the Enterprise A firewall, it is physically co-located with and directly addressable by the IXP connector 151 without the need to communicate over the wider IXS network 150. Alternatively, Enterprise B has implemented IXP edge server 154 in a cloud implementation. This and similar implementations advantageously allow the enterprise to utilize the IXS system without implementing and supporting additional hardware and software on-site. Regardless of the physical implementation, the IXP connectors 151, 153 and the IXP edge servers 152, 154 logically remain part of the IXS system and are not part of the enterprise data systems. The logical configuration of the IXS system is described in greater detail in reference to FIG. 2.

A correlation creates a pairing between two XIDs and assigns a floating point value to the pairing. The floating point value may be a correlation value (or certainty) that the two patients are the same individual. A correlation value of 1.0 means that the two XIDs have been absolutely determined to represent the same individual. A correlation of 0.0 means there may be a zero percent certainty that the two individuals are the same. Anything between indicates a degree of certainty that may not be absolute. IXP provides its best available information on the degree to which the individuals are correlated. In implementations, correlations can be added to IXP by import or through an IXP management console.

In an implementation, a file may be dropped into an import directory of the root IXP server 156. The file contains an entry for each correlation to be added. The correlation record may contain the Organization ID for Enterprise A and the Organization ID for Enterprise B and the correlation value. An optional value of the correlation can be set to 1.0 or 0.0 to define the accuracy of the correlation since there may not be any conditional logic for intermediate values.

After the installation of connectors in Enterprise A and Enterprise B and the import of correlation data, the next step may be to integrate IXP with the patient discovery profiles. In an implementation involving NwHIN, organizations have gateways 112, 144 installed which connect them to the NwHIN network. The organizations pass requests seeking patient information into the NwHIN gateways, those requests are described herein in exemplary fashion as "documents," and receive back documents containing the results of their requests.

In the example shown in FIG. 1, Enterprise A submits a request across the NwHIN for Enterprise B's records on Alen Smith. Enterprise A will pass Alen Smith's SSN as patient ID but Enterprise B has no records for that ID. The result is that no records will be returned to Enterprise A unless IXP is used to assist in the information recovery. An IXP connector can be used to secure the ID that correlates to the patient being inquired about during the exchange between Enterprise A and Enterprise B, as shown in FIG. 1.

By way of example only, Enterprise A initiates a request across the public network 120 to Enterprise B with demographic information that identifies the patient 104. For example, a doctor 102 may utilize data app 106 to input or search for records belonging to patient 104. The search may be processed through the master patient index (MPI) 110 and data repository 108. In some implementations, patient 104 may identified by demographic information, such as SSN. In other implementations, the patient 104 may be identified by an identifier created by Enterprise A. In either case, the identifier may contain or may be considered sensitive information and thus as little information pertaining to that identifier should be transferred over a public network more than necessary.

Records may also exist in one or more data systems within the control of Enterprise B. For example, a technician 132 may work in a medical laboratory which has performed blood work for patient 134 being treated at a hospital. Both the laboratory and the hospital may or may not be within Enterprise B. In this example, data app 136, in communication with data repository 140, may be operated by the medical laboratory and data app 138, in communication with data repository 142, may be operated by the hospital. Each data app 136, 138 may identify patient 134 in data repositories 140, 142 using different identifiers, as shown in FIG. 1.

Either patient 104 or doctor 102 may know or believe that records belonging to patient 104 exist in other enterprises. In this example, patient 104 and patient 134 may be the same person. When the doctor uses data app 106 to query Enterprise B, for example, the data app utilizes ESB 114 to call IXP connector 151 with the identifier used by Enterprise A (i.e., 12345). For example, an adapter may be implemented within ESB 114 or otherwise in communication with ESB 114 which is capable of intercepting the message sent by data app 106. Upon intercepting the message, the adapter is configured to call IXP connector 151. The adapter may be implemented in software, hardware, or any combination thereof. From a logical perspective, the adapter may be between data app 106 and gateway 112. In the example of FIG. 1, the adapter may be implemented as part of ESB 114. One of ordinary skill will note, however, that the precise location and implementation of the adapter is a design choice dependent on the implementation of the enterprise data system.

IXP connector 151 returns a temporary string token A that will replace the identifier in the request that will be sent to Enterprise B. In an example, the request contains demographic information that can be used by Enterprise B to identify the patient, but does not include the identifier used in Enterprise A. Enterprise A passes the request through gateway 112 and public network 120 to Enterprise B. One of skill in the art will recognize that, although this process is described using a healthcare example, this process can be utilized in any number of other data system applications. For example, a document may include any attributes which can be used to match a file across organizations, and in fact the document can be replaced by an electronic string of data.

At Enterprise B, gateway 144 receives the request and sends it to ESB 146. ESB 146 then examines the demographic information included in the request to determine if there is a patient match in either or both of data repositories 140, 142. The demographic data for patient 104 is matched with data in the data repositories 140, 142 for patient 134 and a correlation score is assigned to the match, as described above. If the correlation score is above a threshold, the match between is deemed to be confirmed and a response is sent over public network 120 to gateway 112 stating that a match has been confirmed.

Simultaneous to the process described above, a token exchange process is carried out in the IXS system 150. IXP connectors 151, 153 and IXP edge servers 152, 154 are part of IXS system 150, along with IXP root server 156. Although shown in FIG. 1 as including one root server, an IXS system may have any number of IXP root servers. The components of IXS system 150 may communicate with each other through a network. Any networking technology may be used. Each enterprise may have access to a dedicated IXP edge server which includes a data store of the correlations between the data of that enterprise and that of, for example, all other enterprises. The IXP root server(s) include a data store of, for example, all correlations between any two enterprises connected to the IXS system 150. In other words, the data stored on the edge servers is a subset of the data stored on the root servers. The root servers, in turn, store the aggregation of, for example, all the data stored in all the edge servers connected to the IXS system 150.

At the same time that Enterprise A sends the request to Enterprise B for identity matching, IXP connector 151 retrieves a permanent token identifier which identifies patient 104 and an organization identifier which identifies Enterprise A. These two identifiers can, for example, be coupled with the temporary token A and sent from IXP connector 151 to IXP edge server 152. The correlation is propagated to IXP root server 156. After Enterprise B confirms the match between patient 104 and patient 134, IXP connecter 153 retrieves the permanent token for patient 134 and the organization identifier for Enterprise B and correlates them with temporary token A. This correlation is then sent to IXP edge server 154 and is propagated to IXP root server 156. In IXP root server 156, the identifiers for patient 104 at Enterprise A are correlated with the identifiers for patient 134 at Enterprise B forming a permanent correlation. This permanent correlation is stored in the IXP root server 156 and in IXP edge servers 152, 154 since the correlation involves both Enterprise A and Enterprise B.

Figure 2:
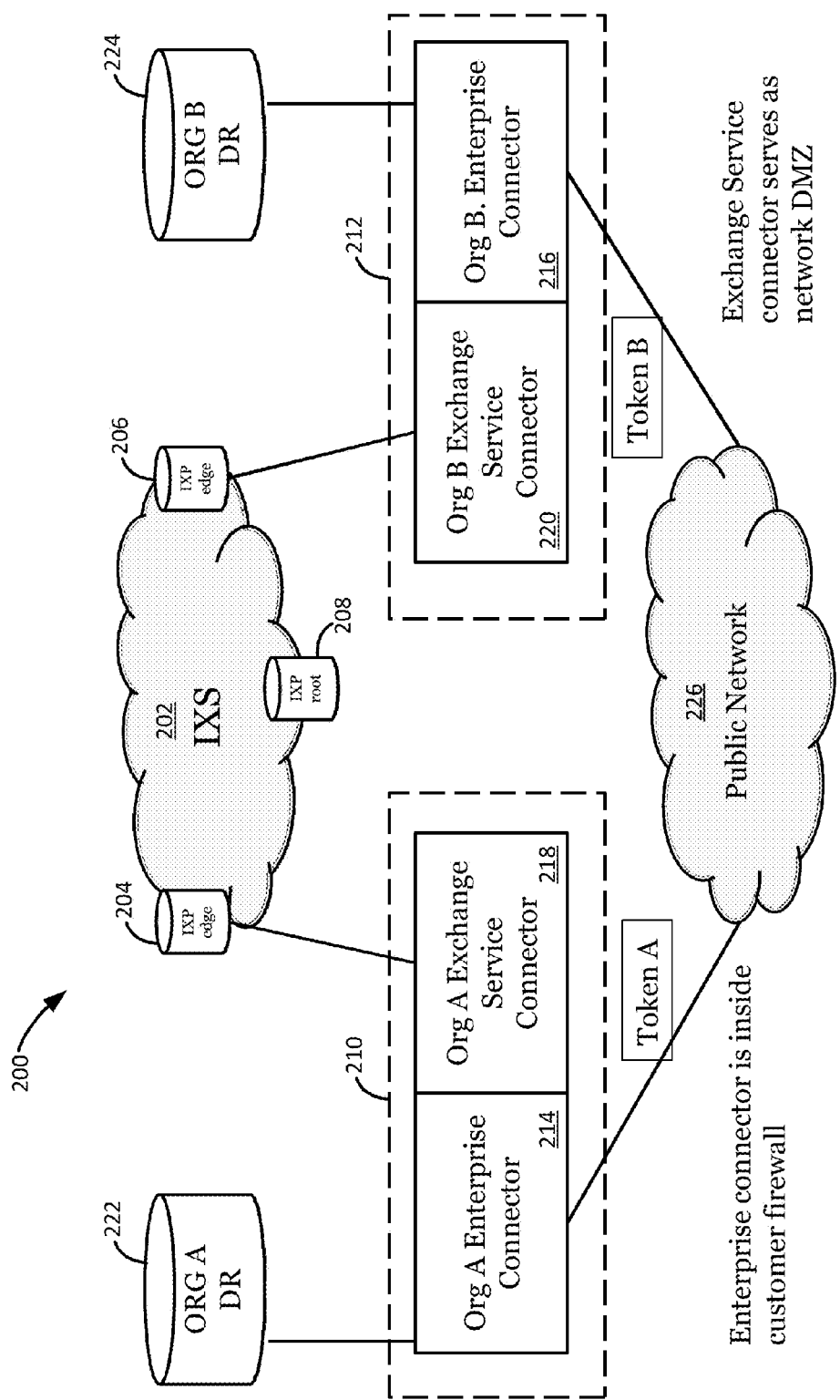
FIG. 2 is a block diagram showing an embodiment of an identity exchange service (IXS) using identity exchange protocol (IXP).

Referring now to FIG. 2, a more detailed logical view of an example IXS system 200 is shown. Connectors 210, 212 may be secure units. In one implementation, the connectors 210, 212 have an exposed Web services API within the enterprise. There are, for example, two sides of the connector. There is an enterprise connector 214, 216 that is exposed to the Web services API within the enterprise. It is called "enterprise connector" because it stores the enterprise identities of the individuals from inside the enterprise. It is assumed, therefore, that all of the activities within the enterprise connector may be running inside of a secure container. Enterprise connectors are sometimes referred to as "red" connectors.

In an embodiment, the enterprise connector 214, 216 is connected to an exchange service connector 218, 220 through an encrypted exchange that allows the linkage between a subject's identity on one side and an anonymous linkage on the other. It is called "exchange service connector" because it interacts solely with the IXS system and does not contain any enterprise specific information. The exchange service connector 218, 220 is a similar secure container. Exchange service connectors are sometimes referred to as "black" connectors.

The secure container on the exchange service connector 218, 220 may, for example, only communicate through two ports. One port communicates to the enterprise connector 214, 216, while the other communicates to the other components of IXS system 202. The connection between the exchange service connector 218, 220 and the other components of IXS system 202 may be a secure VPN between the connector and an IXS edge server 204, 206. In certain implementations, each enterprise will have load-balanced and redundant connectors 210, 212 that may be connected to multiple redundant and load-balanced IXS edge server 204, 206. The IXS edge server 204, 206 will resolve the correlation between the two enterprises using data present at the IXS edge server 204, 206 that is processing the transaction and will route it to the proper enterprise to fulfill the transaction. The IXS edge server 204, 206 may be deployed to the edge of the IXS system 202 or behind the enterprise's firewall to minimize the round-trip time for the enterprises conducting the transaction. In these implementations, the IXS edge server 204, 206 is co-located with the enterprise data system 222, 224.

The IXS edge servers 204, 206 have similar redundant and load-balanced connections to IXS root server(s) 208. The IXS root server(s) 208 control the distribution of correlation pairs to the IXS edge servers 204, 206 and validate the security of the IXS edge servers 204, 206 as well as the connectors 210, 212. The IXS root server(s) 208 reside at the core of the IXS secure, cloud-based system 202. There may be multiple root servers 208 to provide backup and redundancy across the IXS system 202. Further, the edge deployed IXS edge servers 204, 206 may be within the IXS secure cloud-based system 202 or behind the users firewall stabled through a secure VPN, co-located with enterprise data systems 222, 224.

Examples of how connectors 210, 212 may be deployed include the following. The first example is as an enterprise hardware appliance. One or more physical appliances may be deployed inside the enterprise's datacenter with a secure VPN controlled by the IXS system 202 and connecting the exchange service connector 218, 220 to the appropriate IXS edge servers 204, 206. The IXS service provider may control and manage the physical appliance independent from the Enterprise. IXP enterprise connector 214, 216 exposes Web services directly inside the enterprise that facilitate ready and secure access to the protocol.

The second example of a deployment of a connector 210, 212 is an enterprise virtual appliance. One or more virtual appliances may be deployed on a virtual machine inside the enterprise's data center and there is a secure VPN controlled by the IXS service provider connecting the IXS exchange service connector 218, 220 to the appropriate IXS edge servers 204, 206. The IXS service provider controls and manages the virtual appliance, and the local enterprise controls the local machine and the virtual container in which the virtual appliance is operating. Enterprise connector 214, 216 exposes Web services directly inside the enterprise that facilitate ready and secure access to the protocol.

A third example of a deployment of a connector 210, 212 is a cloud-based virtual appliance. One or more virtual appliances may be deployed on a virtual machine inside the IXS system 202. There is a secure VPN controlled by the IXS service provider connecting the IXS exchange service connector 218, 220 to the appropriate IXS edge servers 204, 206. The IXS service provider controls and manages the entire environment with the exception of a secure VPN between the enterprise and the IXS system 202. The Web services API for the IXP enterprise connector 214, 216 will be within the local infrastructure extended by a VPN. IXP enterprise connector 214, 216 exposes Web services directly inside the enterprise that facilitate ready and secure access to the protocol.

The IXP API (Java and Web Services) may be based on messages that get routed, authenticated, encrypted and replied to by the IXS system 202. IXP may be viewed as a messaging backbone that has service nodes which will respond to service requests. A service request may be made by creating a Message document with content (typically a 'Model' may be a bundle of attributes that can be mapped into a useable form for IXP). From the client perspective, the API requires specification of the service name and service action and sending a model with the needed data. Internal IXP logic may build a message, attach the model and translate the service name and action to a service endpoint on the IXS system 202. The message may be sent, and if it requires a response, another message may for example be returned containing a model. The following section will show an example of how these APIs may be used.

IXP Services may use a backing NoSQL data store to keep facilitating our expected scaling requirements. In one embodiment, the IXS system does not store any sensitive customer data on our network except for the data stored on the IXP enterprise connector 214, 216. The IXP enterprise connector 214, 216 may be in a secured VM behind a customer firewall and/or behind an additional DMZ server (e.g., IXS exchange service connector 218, 220). The IXP enterprise connector 214, 216 may map the clients secured data (for example SSN) to tokens that can be used on the public network 226 in place of the actual data. In an implementation of the IXP enterprise connector 214, 216, there may be an import process. Thereafter, the client data system 222, 224 will periodically update this data as new subjects (customers, patients, etc.) may be added at the Enterprise database. In the general case, clients may be expected only to provide minimal data at the IXP enterprise connector 214, 216 to assist IXP in securing client information for transport on the public network 226.

Input files may contain information about subjects. A subject may be a user, patient, customer, and the like that has an identity in the enterprise database. To simplify the import and management of these files, a naming convention for input files may be used. In the case of an input file containing subject data, for example, it may be named "subject-records.xml."

There are, for example, two types of data that may be imported. First is data that is stored on the IXS root server(s) 208 and IXS edge servers 204, 206. The data in the IXS root server(s) 208 may be produced by interactions with other modules that manage identity resolution and consent. However, importers can be provided so that bulk updates may be performed in cases where data files have been vetted from IXP clients. This import facility will be used to get the testing data into the IXS root server(s) 208.

The second type of data that may be imported is data that is stored inside the customer fire wall (i.e., IXP enterprise connector 214, 216). Whenever the IXP enterprise connector 214, 216 or IXS root server(s) 208 are started, a process may check whether an import input directory includes import files that need to be processed. If files are available, they may be processed immediately when the node starts up. Thereafter, the node may check every 15 minutes for any additional input files that may need to be processed. This scheduling scheme may be provided only as a convenience for test teams. In a live environment, there may be a separate import process running in its own VM. This process may have a scheduling facility that allows fine grained control of when and how the batch imports occur.

The importers may be built into the deployed VMS. The importers that run in the IXS root server(s) 208 and IXP enterprise connector 214, 216 may share behavior but may operate on different data. When a file is processed, the data may be imported into the data store in either the IXS root server(s) 208 or IXP enterprise connector 214, 216 and the file may be moved to the processed directory. Also, during the import process, a results file may be produced. The results file may contain a copy of the actual data that was written to the data store, or an error if the data could not be imported. This file may serve as a snapshot of the output data that was produced and persisted from the input files.

Correlation of records may be independent of IXP, but may feed IXP with the data required to perform its function. Correlation, once established, may be pushed to IXP via a provisioning interface. For example, in an implementation, there are three basic types of correlation. First, bulk correlation may be performed when two or more enterprises agree to share patient data and seek correlation. Enterprises may send entire patient repositories (just identifying information in headers, not medical data) to be corrected and matched. A correlation tool may seek the best matches from the data set and provisions in IXP. Once bulk processing is complete, both enterprises transition to continuous correlation and monitoring (see below).

A second type of correlation is pair correlation. For example, an enterprise may already have a correlation between its records that was provided by another organization. The enterprise may seek confirmation of the pairing or correction of any ambiguity in pairing. A correlation tool seeks best matches from set and provisions in IXP. Once paring correlation is complete, both enterprises may transition to continuous correlation and monitoring as further described herein.

A third type of correlation is continuous correlation and monitoring. All new identity records created in an enterprise may be correlated with partner organization identity records to determine if it is an existing pairing. Current pairings may be reviewed continuously for errors in process and data attributes that need correction, a process that may use feedback from patients as well as practitioners. For example, a pairing may, in fact, be incorrect. If this is determined through the continuous correlation and monitoring process, the pairing may be deleted permanently. Additional data may also be stored to indicate that that pairing should preferably not be made again in the future. This process updates records in IXP continuously. There may be no need for enterprises to repair correlations and update identity pairings manually.

Figure 5:
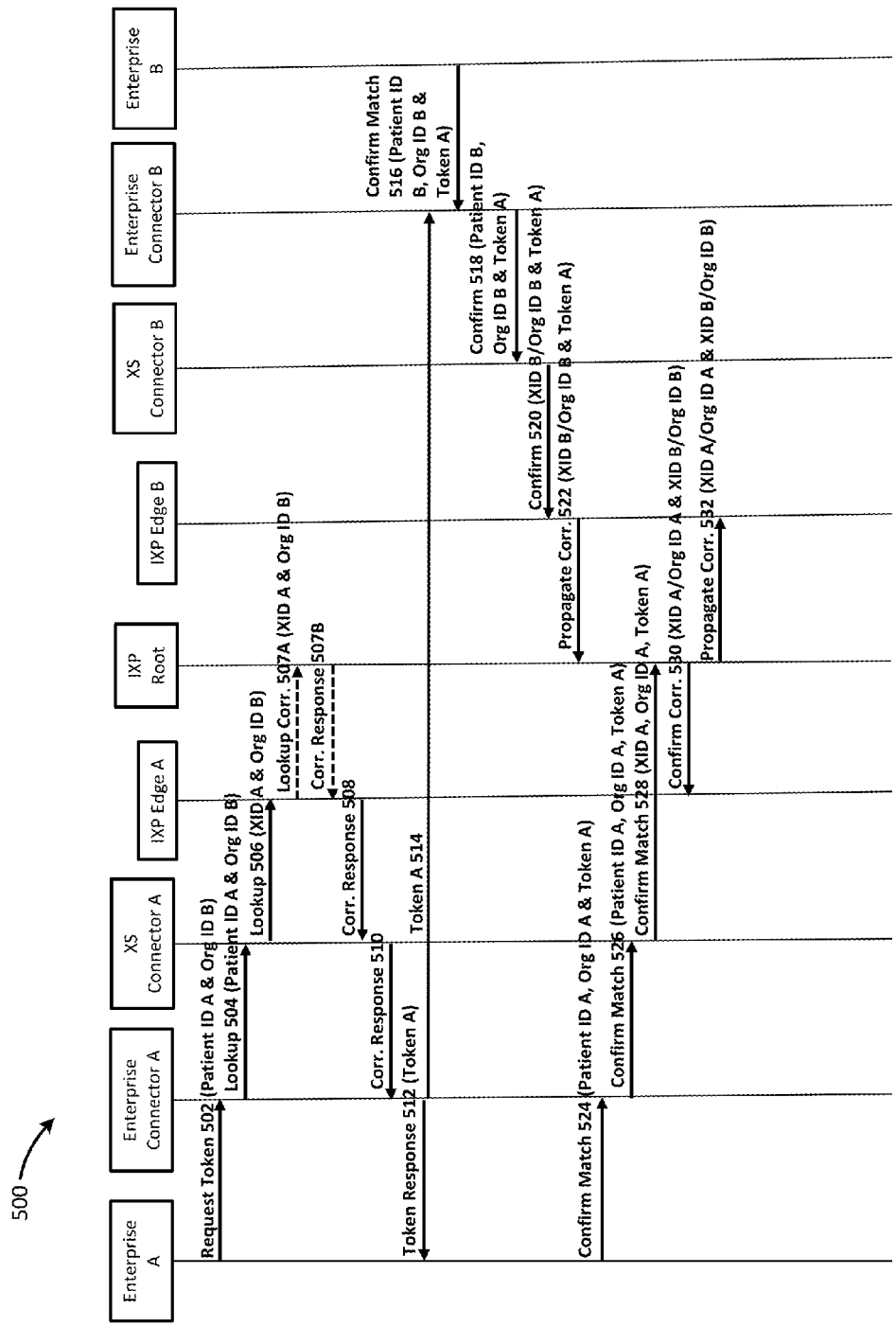
FIG. 5 is a message flow diagram illustrating a method of using IXP within the IXS system.

Referring now to FIG. 3, an example process 300 for exchanging identity information using an implementation of an IXP/IXS system. In this example implementation, correlated data for both Enterprise A and Enterprise B is pre-loaded into root/edge servers. Although the example shown in FIGS. 3, 4, and 5 illustrates the exchange of healthcare patient records, one of skill in the art will recognize may applications of the disclosed system and method. Some applications may require fewer, additional, or different data messages than those illustrated here. The particular format of the messages and the data they contain are design elements within the ordinary skill in the art. The embodiments disclosed in this document are not limited in this regard. As used in reference to FIGS. 3 and 4, a "gateway" means, by way of example only, any hardware or software component that provides access to a public network, such as a wireless or wired local area network, wide area network, telecommunications network, and/or the Internet. As used in reference to FIGS. 3 and 4, "IXP" means, for example, the IXS system accessible through an IXP connector as described above in reference to FIGS. 1 and 2. As used in reference to FIGS. 3 and 4, a "public network" is any network which is not part of the IXS system.

The exemplary process 300 begins when an operator of App A requests patient information or data, such as documents, via patient request 302. The patient document request 302 is sent to Gateway A. Gateway A requests demographic information from enterprise service bus (ESB) A by sending patient identifier cross referencing (PIX)/patient demographics query (PDQ) request 304. ESB A forwards and/or sends PIX/PDQ request 306 to data repository (i.e., Data) A which returns Patient ID A in PIX/PDQ response 308. ESB A takes Patient ID A and requests from IXP A, via token request message 310, Token A which represents Patient ID A in IXS. IXP A sends token response message 312 with Token A back to ESB A which, in turn, sends PIX/PDQ response message 314 to Gateway A with Token A. ESB A also sends a patient documents request 316 to Gateway A with Token A.

Gateway A may now have, for example, all information required to send XCA request 318 to Gateway B in Enterprise B. Gateway B receives XCA request 318 and sends a document request 320 to ESB B that includes Token A. ESB B sends a correlate token request 322 to IXP B to look up the Patient ID B that correlates with Token A. IXP B sends a correlate token response 324 back to ESB B which then sends document request 326 to Data B using Patient ID B. Data B then sends XCA response 328 with the document that was requested. This message cascades from ESB B to Gateway B (response 330), Connect B to Connect A (response 332), Connect A to ESB A (response 334) and ESB A to Data A (response 336). Data A then sends response 338 back to ESB A.

Referring now to FIG. 4, an example process 400 for exchanging identity information using an implementation of an IXP/IXS system. In this example implementation, data is correlated in real time and on a continuous basis.

Process 400 begins in a similar way to the process 300 in FIG. 3. An operator at App A requests patient documents via patient document query 402 to Gateway A. Gateway A then sends a PIX/PDQ request 404 to ESB A which then sends PIX/PDQ request 406 to Data A. Data A sends PIX/PDQ response 408 to ESB A which includes Patient ID A. ESB A sends token request 410 to IXP A which responds with token response 412 which includes Token A. ESB A sends PIX/PDQ response 414 including Token A back to Gateway A.

Gateway A sends XCPD request 416, which includes Token A and Demographics A to Gateway B. XCPD request 418 is sent from Gateway B to ESB B which sends XCPD request 420 to Data B. Data B then conducts a match on Demographics A to determine whether a patient record exists that correlates with the demographic information. If there is, Data B sends XCPD response 422 back to ESB B including Token A and Demographics B, which is demographic information for the match on the system for Enterprise B. The XCPD response 424 with Token A and Demographics B is sent back to Gateway B. Correlation request 426 is sent from ESB B to IXP B to set up a correlation between Patient ID A/Org A and Patient ID B/Org B. This is done through the IXS process described herein.

Gateway B sends XCPD response 428, including Token A and Demographics B back to Gateway A where it cascades down to ESB A (response 430) and to Data A (response 432). Data A compares Demographics B to the record corresponding to Demographics A and confirms the match made by Data B. A confirm match message 434 is sent back to ESB A which sends correlation request 436 to IXP A to correlate Token A and Patient ID A.

ESB A sends a document request 438, including Token A to Gateway A which sends XCA request 440 including Token A to Gateway B. Gateway B sends document request 442, including Token A to ESB B. ESB B sends correlate token request 444 to IXP B which returns correlate token response 446, including Patient ID B. ESB B then sends document request 448 to Data B using Patient ID B. Data B returns with XCA response 450 which cascades down from ESB B to Gateway B (response 452) and to Gateway A (response 454). Gateway A then sends document response 456 to ESB A which sends document response 458 to Data A. Data A sends retrieve documents message 460 back to ESB A.

Data B requests documents from Data A by sending document request 462 with either Token A or Patient ID B. If Patient ID B is used, ESB B sends token request 464 to IXP B which returns token response 466 with Token B. ESB B sends document request 468 with either Token A or Token B to Gateway B which, in turn, sends XCA request 470 with either Token A or Token B to Gateway A. Gateway A sends document request 472 to ESB A, which sends correlate token request 474 to IXP A. IXP A sends correlate token response 476 with Patient ID-A, since both Token A and Token B have been correlated with Patient ID-A through the IXS system, as described above. ESB A then sends document request 478 to Data A requesting documents for Patient ID-A. Data A then sends XCA response 480, with the requested documents, back to ESB A. The XCA response cascades down from ESB A to Gateway A (response 482), Gateway A to Gateway B (response 484), Gateway B to ESB B (response 486), and ESB B to Data B (response 488).

Referring now to FIG. 5, an example process 500 for enabling the secure transfer of information utilizing the IXS system is shown. Before the method 500 is described in detail, definitions of the various components within the system performing the method are provided. As used in reference to FIG. 5, "Enterprise" refers to an enterprise, corporation, group, individual, or any other entity which owns, operates, and/or maintains an enterprise data system, such as, for example, that described above in reference to FIG. 2. As used in reference to FIG. 5, "XS Connector" refers to an exchange service connector similar to that described in reference to FIG. 2. Other components shown in FIG. 5 are also similarly defined herein.

In FIG. 5, Enterprise Process 500 begins with Enterprise A requesting a token for a transaction by sending request token message 502, similar to message 310 of FIG. 3, for example. Message 502 may include, for example, the enterprise specific Patient ID A and organization ID ("Org ID") B. Enterprise Connector A sends a lookup message 504 to XS Connector A to look up the IXS ID ("XID") A that is associated with Patient ID A. If no XID exists for Patient ID A, XS Connector A generates an XID A for use in the IXS system to represent the patient's ID in Enterprise A. XS Connector A, in turn, sends lookup message 506 to IXP Edge A to look up any correlation which is saved for XID A and Org ID B. As described above, IXP Edge servers may store correlations between the XIDs assigned to patients in one enterprise (e.g. Enterprise A), and XIDs assigned to patients in other enterprises (e.g. Enterprise B). If such a correlation is present in IXP Edge A, IXP Edge A sends correlation response message 508, informing that a correlation exists, to XS Connector A. If no correlation is present in IXP Edge A, IXP Edge A may send optional message 507A to determine if a correlation exists in IXP Root. As described herein, IXP Root servers store all correlations between the XIDs of any two enterprises which utilize the IXS system and have established correlations. IXP Root sends correlation response message 507B informing IXP Edge A whether a correlation exists in IXP Root. If there is no correlation in IXP Root, IXP Edge A sends correlation response message, informing that no correlation exists, 508 to XS Connector A. If a correlation does exist in IXP Root, the correlation is propagated to IXP Edge A via correlation response message 507A and IXP Edge A informs XS Connector A of the correlation via correlation response message 508. XS Connector A sends correlation response 510 to Enterprise Connector A informing of the result of the correlation look up.

Regardless of whether a correlation was found, Enterprise Connector A responds to the request token message 502 of Enterprise A with a token response message 512, including Token A, which is used in the processes described herein in reference to FIGS. 3 and 4. Enterprise Connector A also sends Token A, through the IXS system, to Enterprise Connector B (i.e. through XS Connector A, IXP Edge A, IXP Root, IXP Edge B, and XS Connector B) via message 514.

As explained above, Token A may be used to identify a transaction between Enterprise A and Enterprise B. For example, referring to FIG. 4, messages 420 and 422 allow Enterprise B to determine whether the patient at Enterprise A matches a patient at Enterprise B. Referring again to FIG. 5, when the match is confirmed on the part of Enterprise B, a confirm match message 516 is sent to Enterprise Connector B. Message 516 contains Patient ID B, Org ID B, and Token A received from Enterprise Connector A. The confirm message 518 is sent further sent to the XS Connector B to look up the XID B associated with Patient ID B. The XS Connector B sends Confirm Message 520 to IXP Edge B which sets up a temporary correlation between XID B/Org ID B and Token A. Once the correlation is set up in IXP Edge B, the correlation is propagated to IXP Root via message 522.

A correlation in the IXS system may not be made permanent until the enterprise which initially requested the correlation confirms the match between its records and the records of the other enterprise. For example, in reference to FIG. 4, Enterprise A confirms the record match performed by Enterprise B via messages 432 and 434. Message 436 is shown as establishing the correlation between Token A and Patient ID A. Referring again to FIG. 5, the confirm match message 524 is received from Enterprise A by Enterprise Connector A. Enterprise Connector A then sends a message 526 to XS Connector A. XS Connector A, following look up of the XID associated with Patient ID A, sends confirm match message 528, including the XID/Org ID A and Token A, to IXP Root to set up the permanent correlation between Enterprise A and Enterprise B. Using token A, IXP Root establishes the correlation between XID A/Org ID A and XID B/Org ID B and sends a confirm message 530 to propagate the correlation to IXP Edge A. IXP Root also propagates the established correlation to IXP Edge B via message 532.

In situations where automatic matching may, for example, be unavailable, the enterprise data systems may, for example, include an interface for person enabled correlation ("PEC"). PEC is a special form of matching implemented to augment records that should, for example, preferably be matched, yet remain somewhat more difficult to match or may be nearly unmatchable via an automatic solution. PEC leverages the accuracy of person provided credentials, such as a username and password, to match the records of an individual that should, for example, preferably be matched across two different organizations when the individual is able to login to each of the organizations at for example roughly or generally the same time (e.g. within the same session). For example, an individual may login to a first site operated by a first enterprise. This may normally give them access to their records at the first enterprise. Similarly, they also may login to the second site operated by a second enterprise. This would give them access to their records at the second enterprise. Since the individual may have met whatever proofing requirements were required to manage the risk at the two different sites to get access to their data, the health information held by the two distinct enterprises may be linked to the same individual across both different organizations. In other words, the records between the two enterprises are matched.

Figure 6:
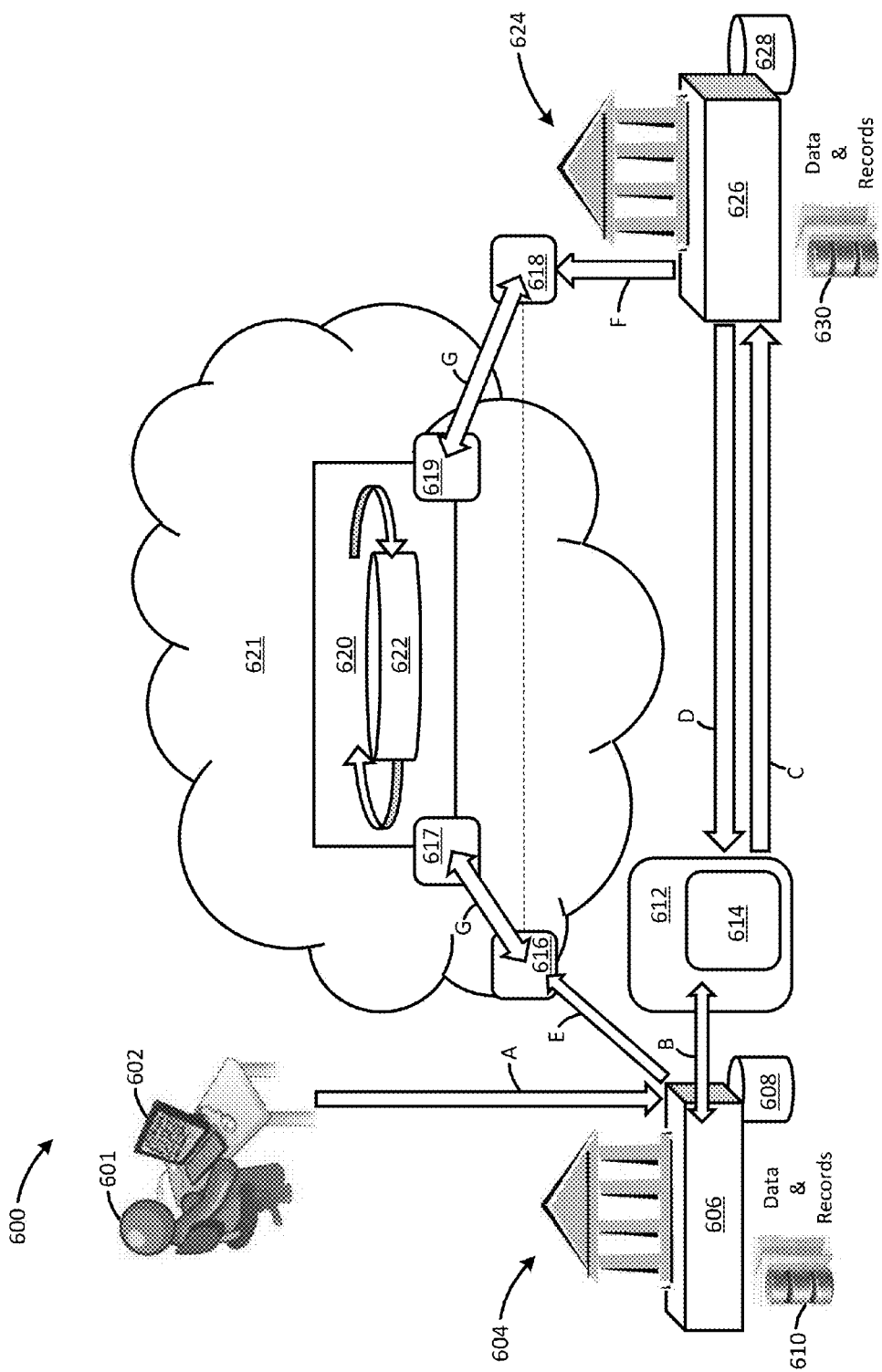
FIG. 6 is a system diagram showing an embodiment of person enabled correlation.

PEC may be, for example, executed through the implementation of the security assertion markup language (SAML), OpenID, Kerberos, or any other identity assertion technology or standard known to one of ordinary skill in the art. Referring now to FIG. 6, an example implementation 600 of PEC is shown. A person (for example a patient) 601 using terminal 602 may login to the first site displayed on the terminal 602 and operated by a first enterprise 604 (arrow A). Enterprise 604 may include an identity and access management (IDAM) system 606 which authenticates the person's credentials to a website 612, hosted on web server (arrow B). The technique for authentication is that specified by the operator to get access to their enterprise data about that person. The IDAM system 606 includes a directory table 608 and data store 610. In this embodiment, the IDAM system may or may not be physically located with the rest of the enterprise assets. Alternate embodiments allow enterprises to use IDAM systems that are shared across one or more alternate enterprises that may or may not participate in PEC. Similarly, enterprise 624 may include IDAM system 626, directory table 628, and data store 630.

While logged on to website 612, a person 601 may be presented an option to correlate records between the first enterprise 604 and a second enterprise 624. If the person 601 elects to, for example, correlate the records between these enterprises, an identity assertion message may be sent from the first enterprise IDAM system 606 to the PEC server 616. The election to correlate records with the second enterprise opens another site 614 such that it is either directly or indirectly associated with the transactional session from the first site. Either the first enterprise 604 or the second enterprise 624 may also put a time requirement on the time period between the login to site 612 and the election by the person 601 to correlate between the enterprise. If the time limit since the original authentication has expired, then the person may be required to authenticate again by IDAM system 606 or IDAM system 626 as appropriate. In this embodiment, this new site may communicate with IDAM 626 and allows person 601 to enter login credentials for the second enterprise 624 via website 612 hosted by the first enterprise 604 (arrows C & D). Alternate embodiments allow a person 601 who has not yet created an identity representation in the second enterprise to prove their identity and receive or create login credentials for the new site if they do not already exist. It is important to note that the first IDAM 606 may be physically the same as the second IDAM 626, but it may be configured logically to operate such that the first IDAM 606 and the second IDAM 626 have different authentication requirements for the person 601.

For example, as a result of a successful login, IDAM 606 may send a SAML or alternate identity assertion to a first enterprise PEC server 616 (e.g., the enterprise connector) (arrow E). In this embodiment, the SAML assertion includes the person's 601 unique identifier assigned by the first enterprise 604 and a unique enterprise identifier of the first enterprise 604. Alternate embodiments allow the identity assertion contain some other identifier (or identifiers) that is separately correlated to the unique identifier of the person 601 within enterprise 604. While in the same session, the person 601 may login to the second site operated by second enterprise 624 via site 614, which is similarly capable of sending an identity assertion (for example, SAML) to the second enterprise PEC server 618 (e.g., second enterprise connector) within the second enterprise 624 with a unique identifier assigned by the second enterprise 624 and a unique enterprise identifier of the second enterprise 624. (arrow F).

The PEC server 616 and the PEC server 618 may be physically separate or combined into a single physical server. When combined into a single physical PEC server, the first enterprise 604 and the second enterprise 624 is logically unique.

The PEC server may be used to provision an identity match between two enterprises in the IXS system or alternate identity correlation system. The IXS system 620 correlate identities across different enterprises (or systems) without the need for the enterprises to maintain the correlations. The IXS system may, for example, obfuscate the enterprise unique identifiers for individuals where the correlation occurs in data store 622. IXS 620 may, for example, operate within a secure network 621 and messages may be transmitted between IXP connectors 617 and 619 through that secure network (arrows G). For the purposes of FIGS. 6 and 7, the term "IXS system" or "IXS" include Exchange Service ("XS") connectors, IXS edge servers, and IXS root servers as illustrated and described in FIG. 2 and associated description above.

Figure 7:
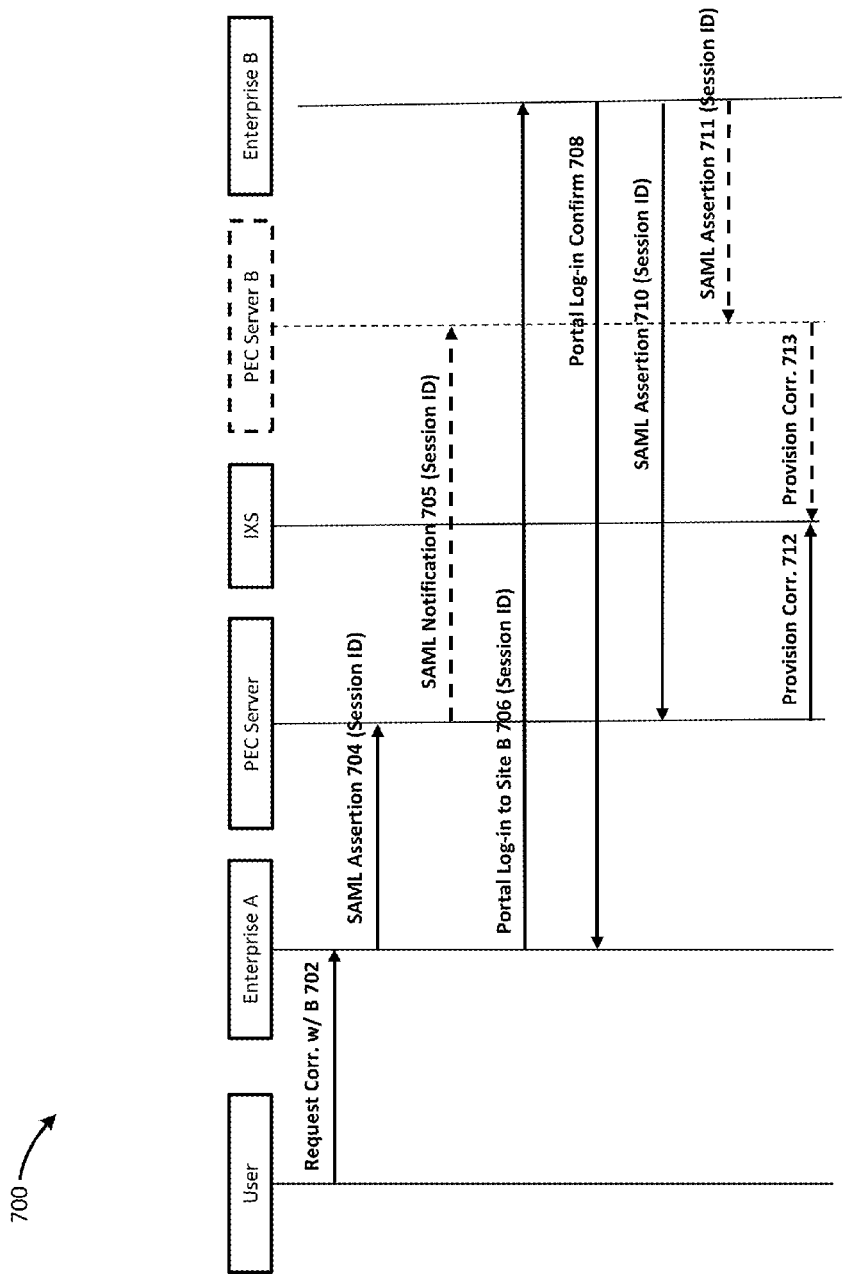
FIG. 7 is a message flow diagram illustrating a method of using person enabled correlation.

Referring now to FIG. 7, an example signaling diagram shows one implementation of PEC. In an example, a person may login to Enterprise A. In one of the following screens, the person may, for example, be offered the opportunity to manually correlate the records between Enterprise A and any partner with which Enterprise A has the ability to perform PEC. A list of enterprises may be presented to the person containing enterprises with which Enterprise A conducts PEC is present on the PEC server. The person may select Enterprise B from a list of enterprises presented to them and requests that records from Enterprise A and B be correlated with each other 702.

The act of selecting Enterprise B from the list of enterprises may send an identity assertion from Enterprise A to the PEC Server via message 704 which may contain, among other things, a Session ID for the authenticated session with Enterprise A. In some embodiments there may be multiple PEC servers. For example, PEC Server B may be co-located with Enterprise B. In these implementations, a SAML notification 705 may be sent from the first PEC Server to PEC Server B including, among other things, the Session ID. On the person's terminal and within the frame of the session from Enterprise A, the login screen from Enterprise B may appear. Using the portal to Enterprise B, the person may login, via message 706, to Enterprise B within the frame for Enterprise A. The login may, for example, be confirmed via message 708. After the completion of a successful login, Enterprise B may send an identity assertion 710 to PEC Server with, among other things, the session ID from the login 708. In the alternative implementations with multiple PEC servers, Enterprise B may, for example, send SAML assertion 711, which may contain the same Session ID, to PEC Server B. The login transference process of PEC then may close out, and the correlation between the identity in Enterprise A and the identity in Enterprise B may be sent to IXS via provisioning correlation message 712. In the alternative implementations with multiple PEC servers, PEC server B, for example, may send the provisioning correlation message 713 to IXS.

The Web workflow for PEC, which is shown by way of example only in FIGS. 6 and 7, may be customized to provide a tutorial, for example, to explain the PEC process to the end-user in detail. Additionally, a person who has experience with this process can complete the process very rapidly through a PEC express interface that allows a person to conduct the process without the tutorial steps and explanations.

The Web workflow to affect this exchange of similar assertions may be standardized to a template that can be provided to customers as required to help facilitate the implementation of PEC. PEC is one example of a mechanism to provision IXS with a matched pair to enable future correlation while it can also be used to provision an identity correlation in other systems. In the current state of the art, correlation of identities is conducted by deterministic or probabilistic identity matching algorithms. PEC allows an individual who faces historical challenges with automated identity matching to leverage the identity provisioning processes of the enterprises with whom they have done business to serve as the correlation across enterprises without the ability or desire to do so in an otherwise automated or manual process.

An enterprise may have the capability to make an identity assertion (as an example, using SAML or OpenID) based upon the person's existing login. For example, an enterprise may be provided the destination for the identity assertion to its PEC Server, or one hosted on an external website for them. The assertion may contain, for example, a unique identifier for the individual associated with the enterprise as well as the session ID that generated the assertion. In some implementations, the unique identifier used in the assertion process may not be the same unique identifier for the person's unique identity in the enterprise (like user ID, medical record number, or account number). In this case, the enterprise may enable the PEC Server to resolve the identity assertion unique ID and the enterprise person ID during the transaction. This can be done with a table, or a directory, for example.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for correlating protected data between a first protected data system and a second protected data system, the method comprising:

receiving, at a first enterprise server via a first network, a first login credential associated with a first user, wherein the first enterprise server includes a data table that includes a plurality of unique identifiers each associated with a login credential of a single user;

generating, at the first enterprise server, a session identifier in response to receiving the first login credential;

receiving, at the first enterprise server via the first network, a request to login to a second enterprise server, wherein the request includes a second login credential associated with the first user for the second enterprise and the session identifier;

transmitting, by the first enterprise server via the first network, the request to the second enterprise server and receiving, in response to the request, a login confirmation from the second enterprise server;

generating, at first enterprise server, a first assertion message from the first enterprise server, wherein the first assertion message includes a first unique identifier that is associated with the first login credential of the first user and the session identifier;

sending, to a first correlation server via the first network, the first assertion message, wherein the first correlation server generates and sends via a second network, in response to the first assertion message, a notification message to a second correlation server that includes the first unique identifier and the session identifier, and wherein, based on the session identifier, first data held by the first enterprise and associated with the first login credential and second data held by the second enterprise and associated with the second login credential are correlated in the second correlation server, wherein the first and second correlation servers are in communication with, via the second network, an identity exchange service (IXS) infrastructure in communication with the correlation server via a second network, the IXS infrastructure comprising:

a first edge server in communication with said first correlation server via the second network, wherein the first edge server comprises a data store for storing correlation data sets;

a second edge server in communication with said second correlation server via the second network, wherein the second edge server comprises a data store for storing correlation data sets; and at least one root server in communication with said first and second edge servers via the second network.

2. The method according to claim 1, wherein the first login credential of the first user is received via a first website hosted by the first enterprise.

3. The method according to claim 2, wherein the request to login to the second enterprise server is received via the first website.

4. The method according to claim 1, wherein the request to login to the second enterprise server must be received within a first time period, wherein the time period starts when the first login credential of the first user is received.

5. The method according to claim 4, wherein the request to login to the second enterprise server is received outside of the first time period, the method further comprising:

requiring the first login credential to be sent a second time;

receiving the first login credential a second time; and generating a new session identifier based on the first login credential that was received a second time.

6. The method according to claim 1, wherein assertion messages are implemented using a security assertion technology selected from a group consisting of: security assertion markup language (SAML), OpenID, and Kerberos.

7. The method according to claim 6, wherein the security assertion technology used for the first assertion message and the second assertion message are the same.

8. The method according to claim 7, wherein security assertion technology used for the first assertion message and the second assertion message are different.

9. A system for correlating protected data across independent data systems, the system comprising:

a correlation server in communication with a first protected data system and a second protected data system via a first network;

an identity exchange service (IXS) infrastructure in communication with the correlation server via a second network, the IXS infrastructure comprising:

a first edge server in communication with said correlation server via the second network, wherein said first edge server includes a first edge data store for storing correlation data sets that correlate data records in said first protected data system with data records in other data systems using permanent tokens generated by said correlation server;

a second edge server in communication with said correlation server via the second network, wherein said second edge server includes a second edge data store for storing correlation data sets that correlate data records in said second protected data system with data records in other data systems using permanent tokens generated by said correlation server; and at least one root server in communication with said first and second edge servers via the second network, wherein said at least one root server comprises a root data store for storing identity correlations generated by said root server and propagated to said first and second edge servers, wherein the correlation server is configured to:

receive a first assertion message, via the first network, from the first protected data system comprising a first unique identifier that is associated with a first login credential of a first user and a session identifier that identifies an authenticated session of the first protected data system authenticated by the first login credential of the first user;

receive a second assertion message, via the first network, from the second protected data system comprising a second unique identifier that is associated with a second login credential of a first user and a session identifier that identifies an authenticated session of the first protected data system authenticated by the first login credential of the first user; and generate and send, in response to the second assertion message and based on the session identifier, a correlation provisioning message to the IXS infrastructure, via the second network, that correlates first data held by the first protected data system and associated with the first login credential and second data held by the second protected data system and associated with the second login credential.

10. The system according to claim 9, wherein the first login credential of the first user is received via a first website hosted by the first enterprise.

11. The system according to claim 10, wherein the request to login to the second enterprise server is received via the first website.

12. The system according to claim 9, wherein assertion messages are implemented using a security assertion technology selected from a group consisting of: security assertion markup language (SAML), OpenID, and Kerberos.

13. The system according to claim 12, wherein the security assertion technology used for the first assertion message and the second assertion message are the same.

14. The method according to claim 12, wherein security assertion technology used for the first assertion message and the second assertion message are different.

15. A method for correlating protected data across independent data systems, the method comprising:

receiving, at a second correlation server, a notification message from a first correlation server via a first network that includes a first unique identifier that is associated with a first login credential of the first user and a session identifier that identifies an authenticated session, authenticated by the first login credential of the first user, of a first enterprise server in communication with the first enterprise connector, wherein the notification message was generated in response to a first assertion message from the first enterprise server that includes the first unique identifier that is associated with the first login credential of the first user and the session identifier, receiving, at the second correlation server in response to a request from the first enterprise server to login to a second enterprise server, a second assertion message from the second enterprise server via the first network, wherein the request includes a second login credential associated with the first user for the second enterprise server and the session identifier, and wherein the second assertion message includes a second unique identifier that is associated with the second login credential of the first user and the session identifier;

generating, by the second correlation server, and transmitting to an identity exchange service (IXS) infrastructure via a second network, in response to the second assertion message and based on the session identifier, a correlation provisioning message informing the IXS infrastructure of the correlation between first data held by the first enterprise server and associated with the first login credential and second data held by the second enterprise and associated with the second login credential, wherein the IXS infrastructure comprises:
a first edge server in communication with said first correlation server via the second network, wherein the first edge server comprises a data store for storing correlation data sets;
a second edge server in communication with said second correlation server via the second network, wherein the second edge server comprises a data store for storing correlation data sets; and
at least one root server in communication with said first and second edge servers via the second network.

* * * * *